(No Model.)
M. S. THOMPSON.
BRAZING OR SMELTING APPARATUS.
No. 524,450. Patented Aug. 14, 1894.
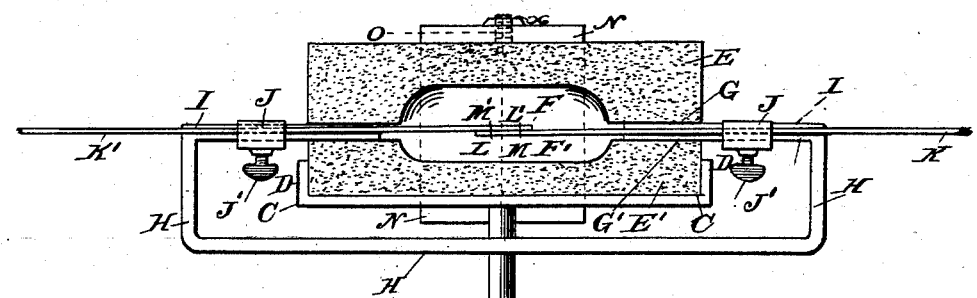
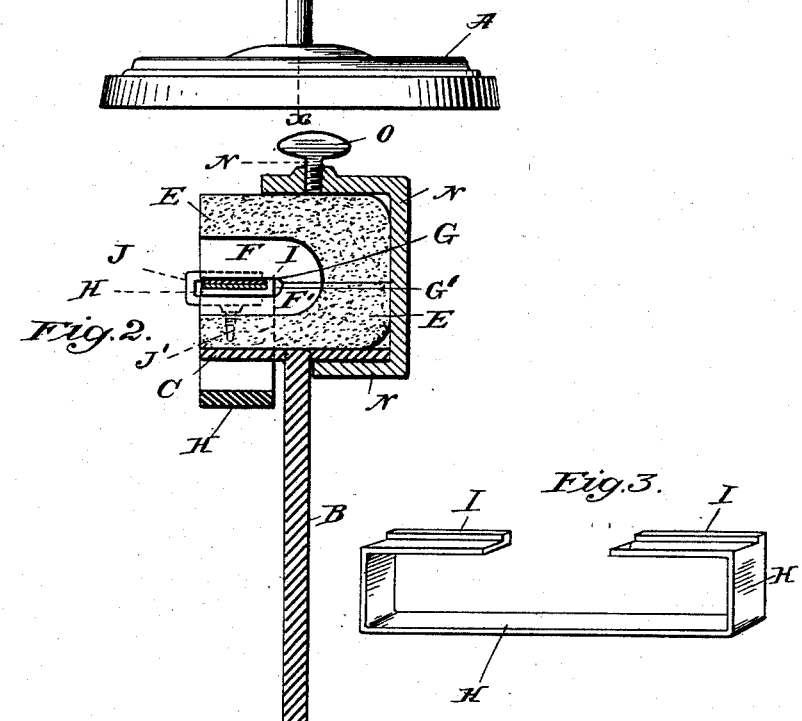
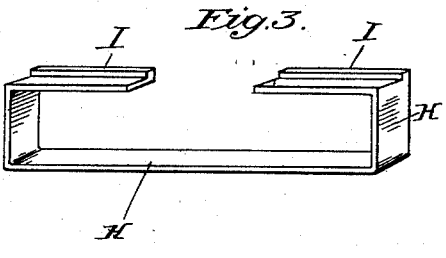

UNITED STATES PATENT OFFICE.

MARK S. THOMPSON, OF NEW YORK, N. Y.

BRAZING OR SMELTING APPARATUS.

SPECIFICATION forming part of Letters Patent No. 524,450, dated August 14, 1894.

Application filed July 24, 1893. Serial No. 481,334. (No model.)

*To all whom it may concern:*

Be it known that I, MARK S. THOMPSON, a citizen of the United States, and a resident of New York city, in the county of New York and State of New York, have invented certain new and useful Improvements in Brazing or Smelting Apparatus, of which the following is a specification.

My invention relates to a new and improved apparatus for brazing or soldering, it being also applicable to use as a furnace for melting or heating metals in small crucibles or otherwise, and it consists in the construction and arrangement of the parts hereinafter described and specifically recited in the claim hereof.

In the drawings I show the apparatus as adapted to the brazing together of thin strips of metal, such as a band saw. It will be understood, however, that the apparatus is adapted to a great variety of special arrangements for doing different kinds of work.

Figure 1, is a front elevation of the apparatus. Fig. 2, is a vertical section on the line $x$, $x$, of Fig. 1. Fig. 3, is a perspective of the guiding frame.

A is a base, preferably a somewhat heavy metal plate, upon which the apparatus rests, being supported upon a standard of metal B, which has a table-like part C on its upper end, which preferably has side pieces, D. They are not essential, however.

E, E' are two blocks formed of asbestos, preferably asbestos pulp, mixed with fire-clay, magnesia, lime, plaster of paris or equivalent material. They are hollowed out as at F, F', so that, when the two blocks are on top of each other, the hollowed out portions present a recess in the face of the block, formed in the two halves. At the forward edges these two blocks of asbestos composition are rabbeted out, as at G, G' so as to form a longitudinally extending space, within which a guide frame which supports the saw or other material, which is to be brazed, may be placed.

H is the guide frame, which supports the article to be brazed. The frame is composed of a flat plate of metal bent into the shape shown and is provided with a flange, I on its upper rear edge. This flange is a guide merely for the pieces of metal, so as to secure their proper alignment with each other during the operation of brazing. It will be observed that the frame is open opposite the recesses F, F' (see Fig. 3).

J, J are two clamps provided with thumb-screws J', J' whereby the ends of the saw K, K' are clamped to the frame H. The inner ends of the saw shown at L, L' are represented in Fig. 1, overlapping each other, and fastened together by fine wire M, M', so that the ends will be held in proper position during the brazing operation.

N is a large clamp provided with a thumb screw O, whereby the two blocks of asbestos composition are clamped together when the frame is in position.

The operation is as follows: The asbestos block E' is first put upon the supporting table C. The frame H is then placed upon the block E', its ends resting within the rabbet G' formed therein. The upper block E is then put in position and the two are clamped together by the clamp N. The material to be brazed or soldered is then shoved in endwise over the guiding and supporting frame and its location is rendered certain and exact by causing it to engage with the flanges I on the frame H. Instead of being shoved in endwise, however, the material may be slid in from the front. The small clamps, J, J are then placed in position so as to clamp the metal upon the guiding and supporting frame H. Thereupon a proper flux being used if desired, the flame from a blow-pipe is driven into the recess formed in the two blocks, charcoal or other heating medium being used in the recess if desired; thus an intense heat is immediately created, whereby the brazing is very quickly and perfectly performed. The clamps J, J are then loosened and the brazed article taken away.

It will be noticed by those who are familiar with this art, that the form of the recess in the blocks may be changed to suit the requirements of any special purpose, also that the blocks may be made of pure asbestos without the admixture therewith of any of the materials stated; the asbestos being suitably treated as with water or with a fire-proof adhesive material, such as silicate of soda and molded into the shape desired; I prefer, however to employ them because they render the blocks more dense in structure and are otherwise somewhat more serviceable. Moreover, it is not essential that there should be two asbestos blocks. The device may be made with a single block, having a recess in it. I prefer, however, the form shown, because of easy adjustment of the parts, greater ease in manufacture, less liability to fracture, and because when the two blocks are clamped together, they become practically one block.

I claim—

In a brazing apparatus, a block of fire-proof material constituted of two parts and formed with a recess and having longitudinal spaces leading from said recess to the ends of the block, a removable guiding frame fitting in said spaces and open at a point opposite the recess, clamps carried by the frame, a table and support for the block, and a clamp embracing the upper and lower sides of the block for holding the two parts thereof together, substantially as described.

Signed at New York, in the county of New York and State of New York, this 13th day of July, A. D. 1893.

MARK S. THOMPSON.

Witnesses:
PHILLIPS ABBOTT,
D. JOH. RITTERBAUD.